April 1, 1958     N. P. BORETTI     2,829,239
WELDING ELECTRODE COMPRISING A SHANK AND REMOVABLE CAP
Filed June 7, 1955
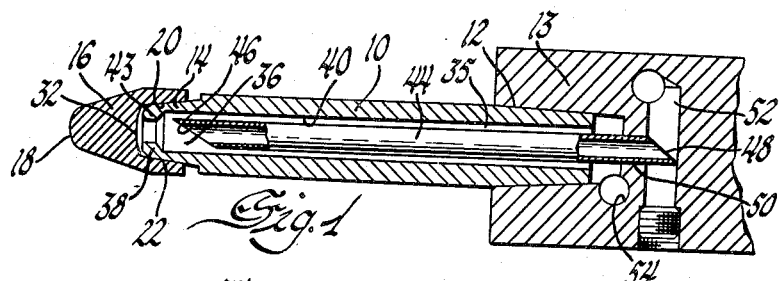
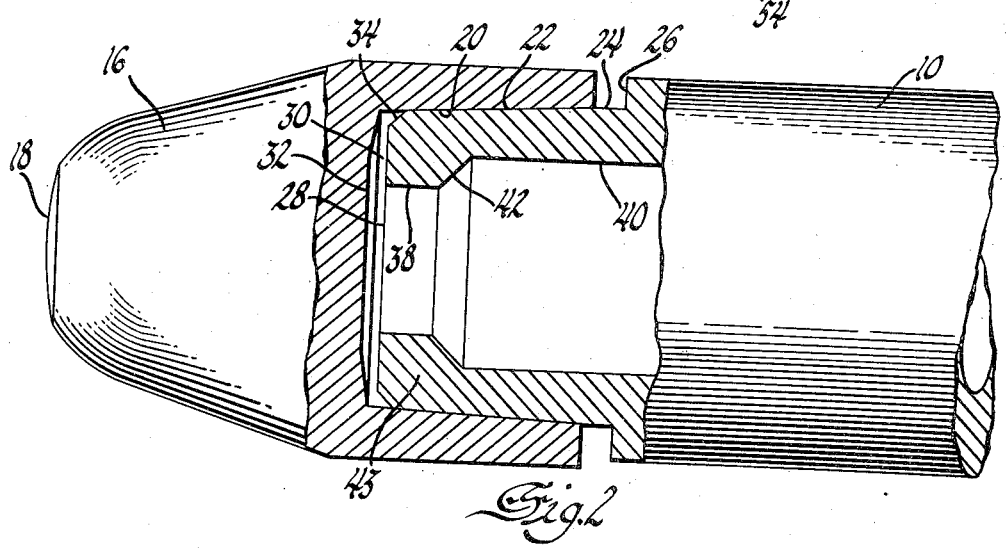
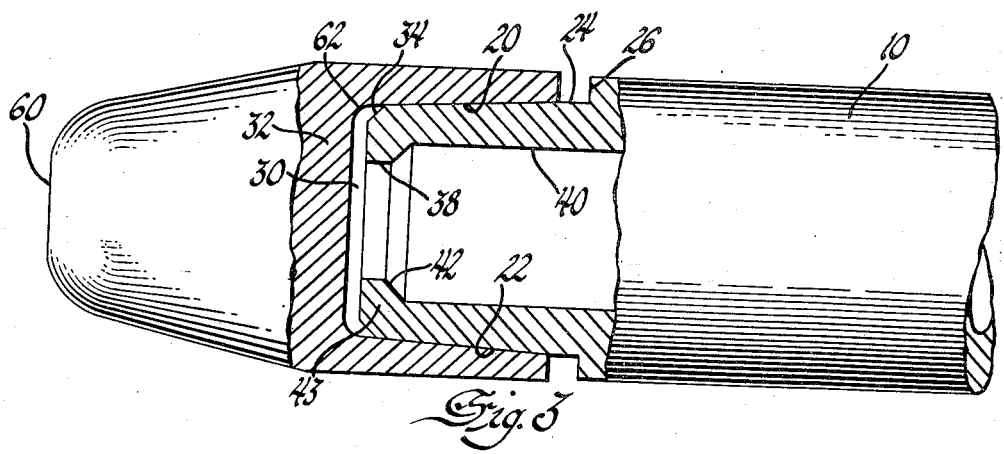
Inventor
Napoleon P. Boretti
By J. E. Ross
Attorney

United States Patent Office 2,829,239
Patented Apr. 1, 1958

2,829,239

WELDING ELECTRODE COMPRISING A SHANK AND REMOVABLE CAP

Napoleon P. Boretti, Detroit, Mich., assignor to General Motors Corporation, Detroit, Mich., a corporation of Delaware Application June 7, 1955, Serial No. 513,779

7 Claims. (Cl. 219—120)

This invention relates to welding electrodes comprising a shank member and a removable tip or cap.

Various constructions of welding electrodes comprising a shank and replaceable cap have been proposed heretofore. In general the prior art constructions have been of two types. In one type the shank has had a closed end and in the other the shank has had an open end. The caps have had an internal tapered surface adapted to mate with a correspondingly tapered portion on the outer surface of the shank. In the closed-end type the cooling fluid is contained within the shank so that the cap may be removed and replaced without loss of cooling fluid. The end closure also strengthens the shank so that the end is not distorted or collapsed during use. However, the closed end type has resulted in a loss in cooling efficiency since the cooling medium is not in direct contact with the cap. On the other hand the open-end type has had better cooling efficiency, but, due to the conditions encountered during use, the open-ended shanks have a tendency to be collapsed so that the caps drop off the shanks.

The primary object of the present invention is to provide an improved welding electrode comprising an open-ended shank and removable cap wherein direct cooling of the cap can be had and at the same time the shank end is so constructed that there is little, if any, likelihood of a cap dropping off. Other objects and advantages of the invention will become more apparent as the description proceeds, especially when considered in connection with the accompanying drawing, in which:

Figure 1 is a longitudinal sectional view of my electrode shank and replaceable cap thereon.

Figure 2 is a fragmentary view of the replaceable cap and shank of Figure 1 on an enlarged scale and with parts broken away to show the construction more clearly.

Figure 3 is a view generally similar to that of Figure 2 showing a modified form of replaceable cap.

The electrode construction illustrated in the drawings is especially adapted for resistance welding of parts. Referring especially to Figures 1 and 2, the electrode construction comprises a hollow shank 10 having one end tapered as indicated at 12 for mounting in a welding head 13 in known manner and its opposite end 14 tapered at 22 for engagement with an inner tapered portion 20 of a replaceable cap 16 having end surface 18 for contacting work to be spot welded. As shown the diameter of the skirt of the cap is substantially the same as the largest diameter of the shank. A very satisfactory taper for the cap and mating cap end of the shank is one of 1.25" per foot. Inwardly from the tapered portion 22 the outer wall 24 of the shank is of circular shape of smaller diameter than that of the main body of the shank such that a shoulder 26 is provided. A wedge shaped tool may be inserted in the gap between shoulder 26 and the end of the cap when it is desired to remove the cap. The outermost end 28 of the shank is spaced at 30 from the portion 32 of the cap. The end 28 of the shank is beveled at 34. The shank has a passage 36 extending longitudinally its entire length. The passage is of a uniform diameter for most of its length as indicated at 40; however adjacent the end 28 the passage is of a smaller diameter 38. The portion of larger diameter is joined to the portion of smaller diameter by a tapered portion 42. In the constructions illustrated the taper 42 is at a 45° angle. As the result of decreasing the size of the passage 36 adjacent the end 28 of the shank as just described there is formed an inwardly projecting reinforcing or stiffening rib 43 which serves to prevent the end of the shank from collapsing or distorting. The size of the rib is dependent on the dimensions, etc., of the shank and cap 16. I have found that for an electrode shank having an outer diameter of .625", a diameter at 24 of .502", a taper between the cap and shank of 1.25" per foot, that the diameter at 40 of the shank passage may be 11/32" and the smaller diameter 38 at the end 28 of the shank may be ¼". This will result in a stiffening rib 43 having adequate strength to prevent the end of the shank from collapsing from the stresses imposed during welding. For a smaller electrode shank, having an outer diameter of 31/64", a diameter at 24 of .402", I have found that the diameter at 40 may be ¼" and the diameter at 38 may be 3/16" to provide a suitable stiffening rib.

Centrally located in the passage in shank 10 as seen in Figure 1 is a tube 44 of smaller diameter than the diameter 40. One end of the tube stops short of the corresponding end of the shank and is tapered as indicated at 46. The opposite end is also tapered as indicated at 48 and is secured to the welding head 13 at 50. The head has an opening 52 within which cooling water or other fluid medium may flow and enter the tube and pass through the same into contact with the surface 32 of the cap and into the space 30 between the cap and shank end. This provides effective cooling since the cooling medium is in direct contact with the cap. The cooling medium then flows outwardly in the annular space 35 between the tube and the passage in the shank until it reaches the head and then flows out of the head through opening 54 as will be readily understood. The tapered portion 42 provides a good angle approach for the cooling medium and results in less turbulence of the cooling fluid than where a 90° shoulder is provided between the portions of large and small diameters.

Figure 3 illustrates a modification of welding cap having a flat work engaging portion 60 and a radius 62 between the tapered skirt 20 of the cap and the cap portion 32. Otherwise the cap is the same as that shown in Figures 1 and 2. The shank is also the same form as shown in Figures 1 and 2. It will be understood that a tube (not shown) like the tube 44 of Figure 1 is used for cooling the cap.

It will be understood that the replaceable caps are worn away during use and have to be replaced. However due to the improved cooling characteristics obtained by directly contacting the cap with a cooling medium such as water the tips are kept cooler and last longer than caps that are not directly cooled. On the other hand, due to the reinforcing or stiffening ribs the ends of the shanks are not readily collapsed or distorted during use and there is little if any tendency for the caps to drop off. Due to the fact that most of the wear on welding electrodes is at the tip end, the use of replaceable caps results in substantial savings. When it is necessary to remove a worn cap it is a simple matter to insert a wedge shaped tool between the shoulder 26 and the end of the cap skirt and apply pressure to force the cap off the tapered end of the shank. The taper of 1.25" per foot is one that affords effective gripping action between the cap and shank and at the same time permits ready removal of a cap when it is desired to replace the same.

Various changes and modifications of the embodiments of my invention described and/or disclosed herein may be made without departing from the spirit and principles of my invention.

I claim:

1. A welding electrode comprising an electrode shank having a longitudinally extending passage therein and an outer tapered surface at one end, said end having an inwardly extending reinforcing rib, and a replaceable electrode cap having an internal tapered surface in mating engagement with the tapered surface on said shank.

2. An electrode shank having a longitudinally extending passage therein and an outer tapered surface at one end to receive a replaceable electrode cap, said passage being of smaller dimension at one end thereof whereby an inwardly extending rib is formed at the end of the shank which acts as a reinforcement to prevent collapse of said shank end when a replaceable cap is mounted thereon.

3. A welding electrode shank having a longitudinally extending passage therein, an outer tapered surface at one end to receive a replaceable electrode cap, said longitudinally extending passage being of smaller diameter at said end receiving said replaceable electrode cap whereby an inwardly extending rib is formed at said end of the shank, said rib acting as a reinforcement to prevent collapse of said shank end, and a tube of smaller cross-sectional dimension than said passage in said passage whereby cooling fluid can be directed through said tube into direct engagement with the cap on said end of a shank and then caused to flow in the reverse direction in the intermediary space between the outer wall of said tube and the inner wall of the shank.

4. An apparatus as in claim 3 in which the tapered surfaces on the cap end of the shank have a taper of 1.25 inches per foot.

5. An electrode shank having a longitudinally extending passage therein of circular cross section and a tapered surface at one end to receive a replaceable electrode cap, said passage being of smaller dimension at said end receiving said replaceable cap whereby an inwardly extending rib is formed at said end of the shank which acts as a reinforcement to prevent collapse of said shank end when a replaceable cap is mounted thereon, said end portion of said passage of smaller dimension being connected to the portion of larger dimension by a tapered surface at an angle of 45 degrees from the axis of said longitudinally extending passage.

6. A welding electrode comprising an electrode shank having a longitudinally extending passage therein, an outer tapered surface at one end to receive a replaceable electrode cap, said passage being of smaller dimension at one end thereof whereby an inwardly extending rib is formed at the end of the shank which acts as a reinforcement to prevent collapse of said shank end when a replaceable cap is mounted thereon, said replaceable electrode cap having a tapered inner surface on a skirt in mating engagement with said tapered surface on said end of the shank, the end wall of the cap skirt being spaced from a shoulder on said shank, and a tube of smaller cross-sectional dimension than said passage centrally located therein whereby cooling fluid can be directed through said tube into direct engagement with the cap on said end of the shank and then caused to flow in the reverse direction in the space between the outer wall of said tube and the inner wall of the shank.

7. An apparatus as in claim 6 in which the taper on the cap and shank is 1.25 inches per foot.

References Cited in the file of this patent

UNITED STATES PATENTS

| | | |
|---|---|---|
| 1,096,205 | Taylor | May 12, 1914 |
| 2,051,284 | Ball | Aug. 18, 1936 |